United States Patent [19]

Sainen

[11] Patent Number: 5,321,621
[45] Date of Patent: Jun. 14, 1994

[54] METHOD OF OPTIMIZING THE CONTROL OF LOOMS FOR IMPROVIDING THE ECONOMIC EFFICIENCY OF A WEAVING MILL

[75] Inventor: Tsutomu Sainen, Kanazawa, Japan

[73] Assignee: Tsudakoma Kogyo Kabushiki Kaisha, Kanazawa, Japan

[21] Appl. No.: 912,175

[22] Filed: Jul. 13, 1992

[30] Foreign Application Priority Data

Jul. 16, 1991 [JP] Japan .................. 3-268102

[51] Int. Cl.$^5$ .................. G06F 15/46; G05B 13/02
[52] U.S. Cl. .................. 364/470; 364/156; 139/1 R
[58] Field of Search .............. 364/470, 148, 156, 172; 139/1 R, 1 D

[56] References Cited

U.S. PATENT DOCUMENTS

| | | | |
|---|---|---|---|
| 4,736,324 | 4/1988 | Sainen | 364/470 |
| 4,835,699 | 5/1989 | Mallard | 364/470 |
| 4,893,250 | 1/1990 | Sainen | 364/470 |
| 5,034,897 | 7/1991 | Sainen | 364/470 |
| 5,060,161 | 10/1991 | Sainen | 364/470 |
| 5,134,568 | 7/1992 | Sainen | 364/470 |
| 5,155,691 | 10/1992 | Sainen | 364/470 |

FOREIGN PATENT DOCUMENTS 1-239138 9/1989 Japan .

Primary Examiner—Long T. Nguyen
Assistant Examiner—Thomas E. Brown
Attorney, Agent, or Firm—Wenderoth, Lind & Ponack

[57] ABSTRACT

A method of optimizing control of looms for the improvement of the economic efficiency of a weaving mill controls set points for the looms so that the economic efficiency of the weaving mill will not be reduced below a standard economic efficiency determined through preparatory test operation of the controlled looms. The controlled looms are operated for a predetermined preparatory test period for preparatory test operation to collect the data of parameters dominating the economic efficiency of the weaving mill and to create reference data. Data of the parameters are collected in a monitoring period during the practical operation of the looms and the data is normalized by the time of the monitoring period to create operation data. The set points for each loom are corrected on the basis of the result of comparison between the reference data and the operation data to determine new set points.

7 Claims, 6 Drawing Sheets

METHOD OF OPTIMIZING THE CONTROL OF LOOMS FOR IMPROVIDING THE ECONOMIC EFFICIENCY OF A WEAVING MILL

BACKGROUND OF THE INVENTION

1. Field of the Invention

The present invention relates to a method of optimizing the control of looms for maintaining the economic efficiency of a weaving mill at a maximum.

2. Description of the Prior Art

A method of optimizing the control of looms disclosed in Japanese Laid-open Patent (Kokai) No. Hei 1-239138 corrects set values of controllable parameters dominating the economic efficiency of the weaving mill so that an economic efficiency evaluation function becomes a maximum. This prior art method determines the maximum of the profit evaluation function through a complex procedure requiring a long time. Since the operating characteristics of the looms vary during a long time necessary for determining the maximum of the profit evaluation function, this method is not very effective and is unable to maintain optimal operating condition.

A method of optimizing the control of looms disclosed in Japanese Laid-open Patent (Kokai) No. Hei 2-289152 uses set operating conditions, such as a set pressure of the picking fluid and a set crank angle, as reference data for which the loom is a adjusted, and determines the causes of an unsatisfactory operating condition of the loom by comparing actual operating conditions with the reference data. This prior art method only compares the actual operating conditions with the reference data determined in adjusting the loom and does not correct the set values positively to improve the economic performance of the loom. Accordingly, this method is unable to control the loom for optimal operation from the view point of operation rate and economic efficiency.

SUMMARY OF THE INVENTION

Accordingly, it is an object of the present invention to control set values of the operating conditions of each loom of a weaving mill so that actual economic efficiency of the weaving mill will not be reduced below a reference economic efficiency determined on the basis of a controlled state of the looms.

In one aspect of the present invention, a method of optimizing control of looms for maximum economic efficiency comprises collecting parameters of the economic efficiency of a weaving mill in a predetermined test period through the preparatory test operation of controlled looms, creating reference data through the analysis of the collected parameters, collecting parameters dominating the economic efficiency of the weaving mill in a monitoring period during the operation of the looms according to changed set points, creating comparative data normalized by the monitoring time, comparing the comparative data with the reference data determined through preparatory test operation, and determining set values for the loom for the improvement of the economic efficiency. Although this optimizing control method is applicable to individual looms of a weaving mill, it is preferable, from the view point of collection and processing of statistical data, to apply the optimizing control method to the centralized group control of a plurality of looms of a weaving mill. Since this optimizing control method may either use or not use an evaluation function for the evaluation of the controlled state and new set values for correction are determined by a fuzzy control system or an expert control system.

The economic efficiency of a weaving mill is represented by the following formulas.

Profit = Unit price of fabric × Production − Cost

Production = f(Operating time × Weaving speed, Acceptable fabric ratio)

Operating time = Available time − (Stop time + Preparation time + Maintenance time)

Shutdown time = Stop frequency × (Wait time + Repair time)

Cost = g(Yarn cost, Energy cost, Labor cost, Equipment depreciation cost, Consumables cost, Loss cost)

Wait time is the sum of time between the stop of the loom and the start of repair work and time between the start of repair work and the completion of repair work.

The foregoing formulas can be rewritten in models for unit time to represent profit, production and operating time by the following expressions.

$$r = 1 - \Sigma s_i \cdot \tau_i - \tau_0 \tag{1}$$

$$m = r \cdot n \tag{2}$$

$$b = m(Q \cdot S - Y) - E(w + K \cdot a) \tag{3}$$

where
- b: Profit
- m: Production
- r: Operating time
- Q: Fraction nondefective
- S: Unit price of fabric
- Y: Yarn cost
- K: Conversion factor for converting the quantity of consumed picking fluid into the quantity of power
- E: Electric power rate
- w: Quantity of consumed power
- a: Quantity of picking fluid consumed for picking
- n: Rotating speed of the loom
- $s_i$: Frequency of stop due to a cause i ($s_1$ = Frequency of warp stop, $s_2$ = Frequency of weft stop)
- $\tau_i$: Average stop time due to a cause i ($\tau_1$ = Average warp stop time, $\tau_2$ = Average weft stop time)

Downtime includes time for which the loom is stopped for looming, malfunction and adjustment. Energy consumption rate and the frequency of stop tend to increase with increase in the weaving speed of the loom. Therefore, when the loom is an air-jet loom, the quantity w of power consumed, the quantity a of air consumed and the frequency $s_i$ of stop are function of the rotating speed n of the loom. The expressions (1), (2) and (3) correspond respectively to the following controlled subjects.

Expression (1): Search for the values of control parameters for the improvement of the operating rate (Control for the improvement of the operating rate)

Expression (2): Search for the values of control parameters including rotating speed, for the increase of production (Control for the increase of production)

Expression (3): Search for the values of control parameters for the increase of profit including reduction of energy loss (Control for the increase of profit)

The present invention relates to the expression (3) and controls optimal set values for the controlled loom to increase the profit of the weaving mill.

According to the present invention, data of parameters dominating the economic efficiency of the weaving mill is collected through the preparatory test operation, the reference data is created on the basis of the data of the parameters, and the set points for the looms are changed according to the result of comparison of the dat obtained during actual operation with the reference data so that the economic efficiency of the weaving mill is improved.

The use of the evaluation functions including constants corresponding to the values of uncontrollable parameters ensures correct recognition of the operating condition of the looms and enhances the reliability of the data used for the correction of the set points to improve the economic efficiency of the weaving mill.

The correction of the set points in controlling the looms by the fuzzy control system or the expert system enables reliable, automatic optimizing control of the looms.

Since the energy consumption of the looms is taken into consideration in correcting the set points to improve the economic efficiency of the weaving mill, the reduction of the economic efficiency of the weaving mill regardless of the operation of the looms at high operating rate and high productivity can be avoided.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENT

Optimizing Control for the Improvement of Economic Efficiency

Even if the production of Fabric is increased through the optimizing control intended to increase the production, the actual profit made by the weaving mill will be reduced if the increase of the energy cost exceeds the increase of the profit. Accordingly, energy consumed by the looms must be included in control parameters to improve the overall economic efficiency of the weaving mill.

The control system includes a wattmeter for measuring the quantity of power consumed by the loom and a flowmeter for measuring the quantity of picking fluid consumed, and controls the loom taking into account the economic efficiency of the loom. The picking fluid consumption of the loom can be reduced by reducing the pressure of the compressed picking fluid or reducing the picking fluid jetting period. Generally, a picking control device is provided with an automatic control system for the optimal control of the pressure of the compressed picking fluid or for the optimal timing of the picking fluid jetting operation to ensure the stable insertion of weft yarns. If the picking control device is provided with such an automatic control system, it is possible to reduce picking fluid consumption indirectly by reducing the rotating speed of the loom instead of directly reducing picking fluid consumption by reducing the set pressure of the compressed picking fluid. If the picking control device is not provided with such an automatic control system, the set pressure of the picking fluid is changed.

Centralized Control System

Figure 1:
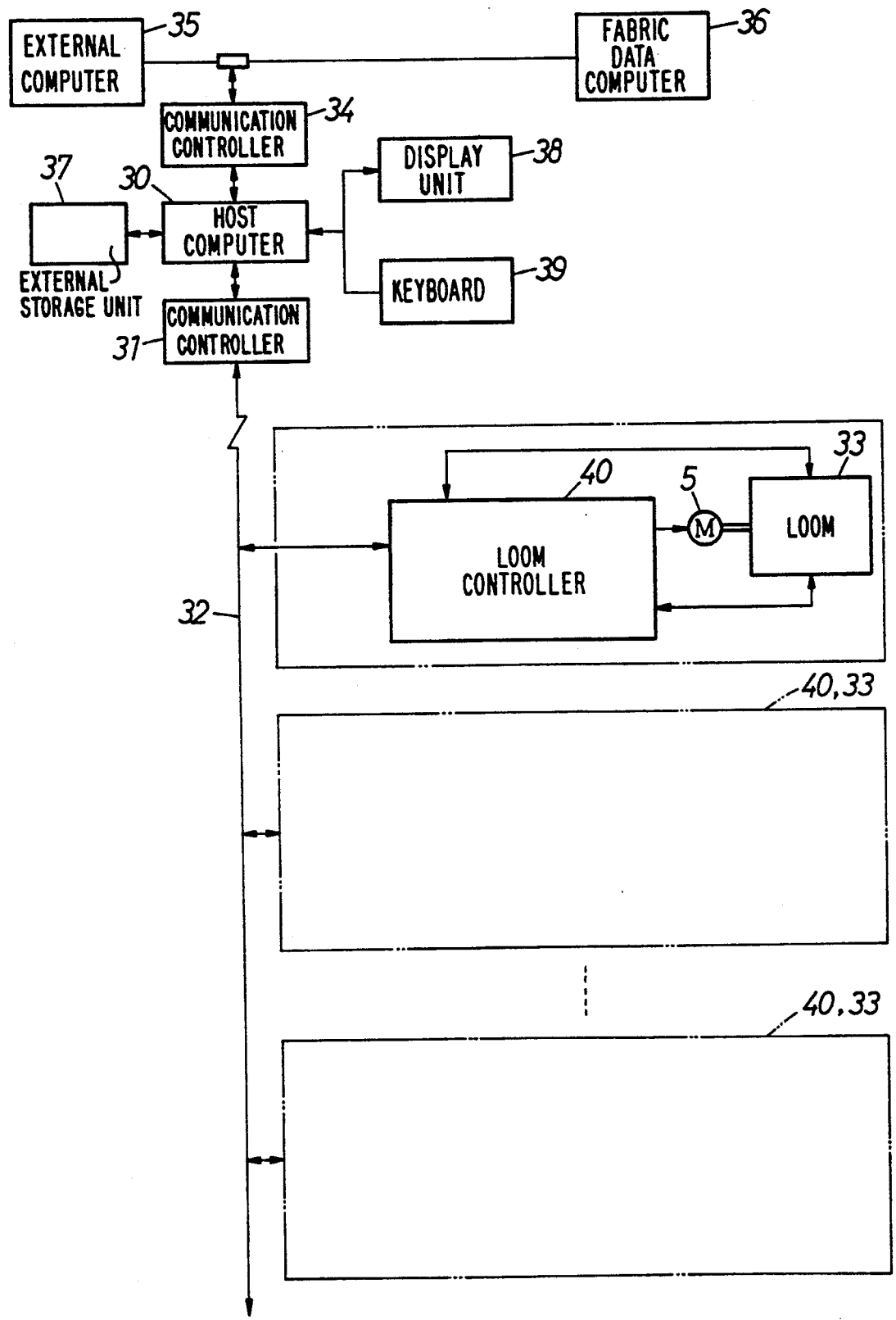
FIG. 1 is a block diagram of a control system for carrying out the centralized control of a weaving mill to increase the economic efficiency of a weaving mill.

Referring to Fig. 1 showing a centralized control system, loom controllers 40 for controlling looms 33 are connected through a communication controller 31 to a host computer 30 by communication lines 32, an external computer 35 and a fabric data computer 36 are connected through a communication controller 34. Also connected to the host computer 30 are an external storage unit 37, a display unit 38 and a keyboard 39.

Figure 2:
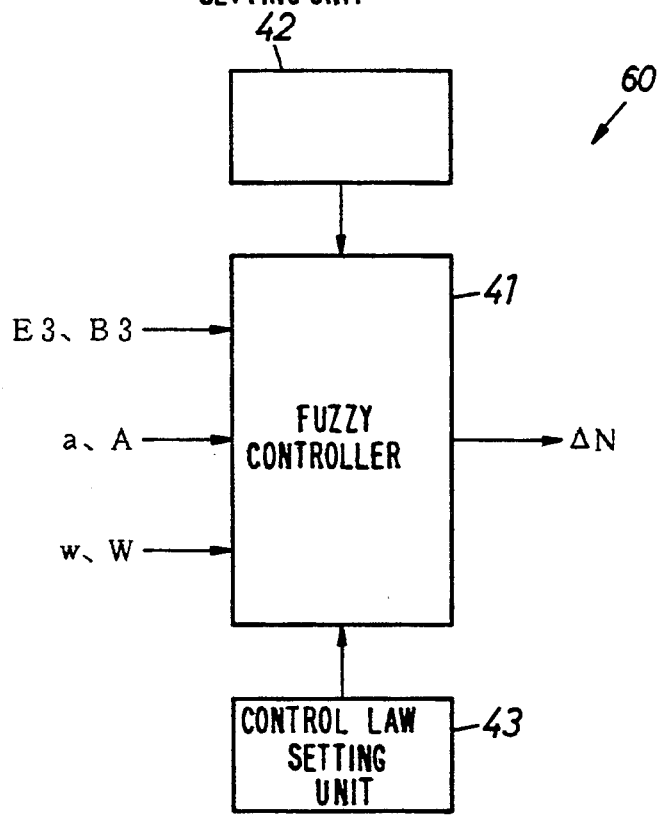
FIG. 2 is a block diagram of a fuzzy controller.

Referring to FIG. 2, the host computer 30 has an internal fuzzy controller 60 comprising a fuzzy controller 41, a membership characteristic function setting unit 42 connected to the fuzzy controller 41 and a control law setting unit 43 connected to the fuzzy controller 41. The fuzzy controller 41 receives values of evaluation functions E3 and B3 and provides a rotating speed change data DN for changing the rotating speed of the loom.

Figure 3:
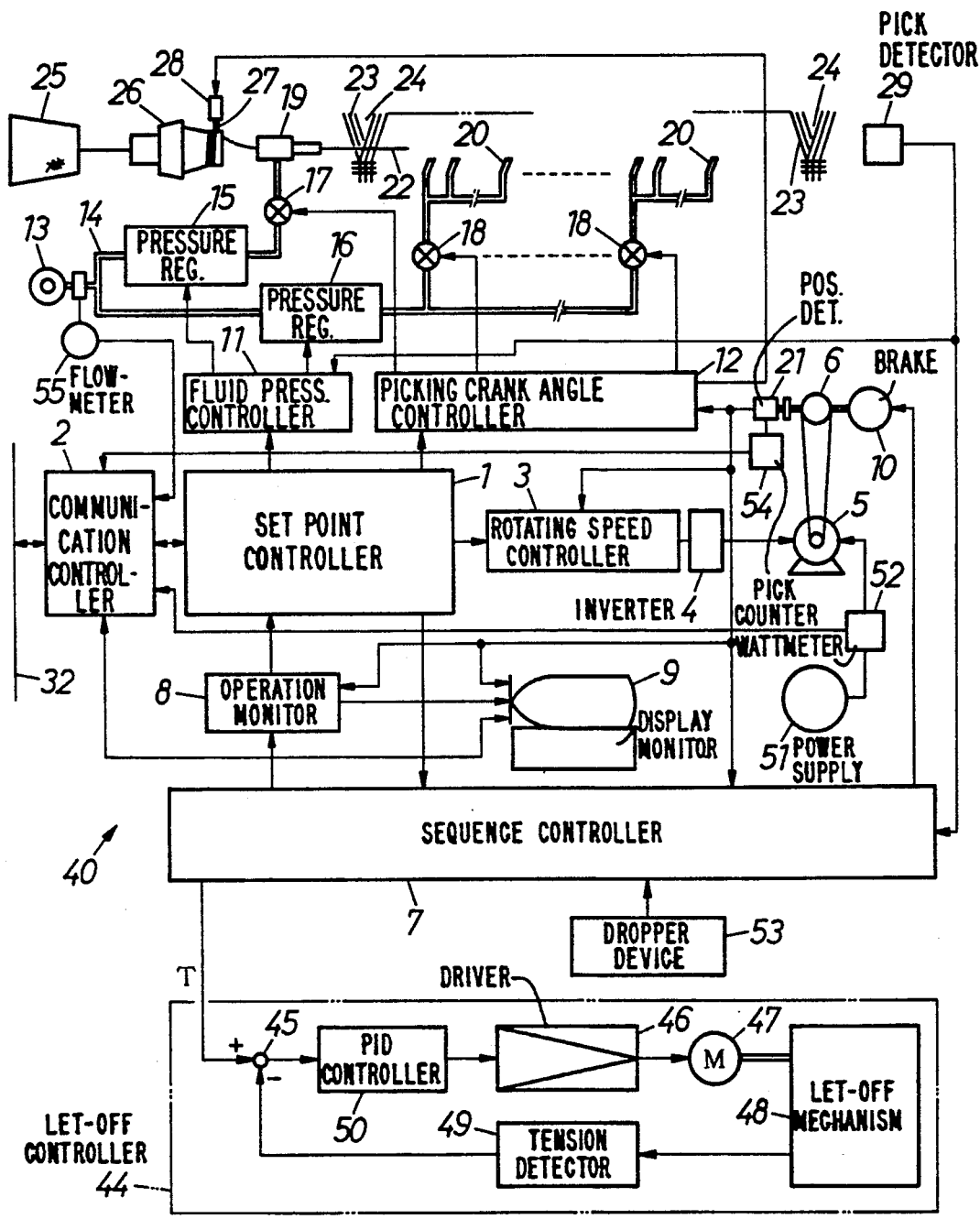
FIG. 3 is block diagram of a loom control system.

Referring to FIG. 3 showing the loom controller 40 and the components of the associated loom 33, a set point controller 1 is connected through a communication controller 2 to the host computer 30. The output side of the set point controller 1 is connected through a rotating speed controller 3 and an inverter 4 to a main motor 5. The main motor 5 is interlocked with the crankshaft 6 to drive the crankshaft 6 for rotation to drive the mechanisms of the loom for a weaving operation. The power consumption w of the main motor 5 is measured by a wattmeter 52 provided on a line connecting the main motor 5 to a power supply 51.

The set point controller 1 is connected to a sequence controller 7, which controls the let-off operation, take-up operation and start/stop of the loom, and control sequences defining steps of repair operation to be carried out when the loom is stopped by the weft stop motion or the warp stop motion. The input side of the sequence controller 7 is connected to a pick detector 29 and a dropper device 53, and the output side of the same is connected to the set point controller 1 and a display monitor 9 through an operation monitor 8 and to an electromagnetic brake 10 for braking the crankshaft 6. The display monitor 9 is also connected to the communication controller 2 to display input data.

The sequence controller 7 is connected to a let-off controller 44 to apply a signal representing a desired warp tension T to a comparator 45 connected to a PID controller 50. The PID controller 50 controls a driver 46 driving a let-off motor 47 driving a let-off mechanism 48 rotating a warp beam to let off warp yarns 23. A tension detector 49 detects the tension of the warp yarns 23 and gives a signal representing the tension of the warp yarns 23 to the comparator 45 for negative feedback. Thus, the PID controller 50 controls the driver 46 according to the deviation between the desired warp tension and the actual warp tension detected by the tension detector 49.

The output side of the set point controller 1 is connected to a fluid pressure controller 11 and a picking crank angle controller 12. The fluid pressure controller 11 controls pressure regulators 15 and 16 provided on a line 14 connected to a compressed fluid source 13 to supply compressed picking fluid of an appropriate pressure through a shutoff valve 17 to a main picking nozzle 19 and through a plurality of shutoff valves 18 to a plurality of auxiliary picking nozzles 20. The picking crank angle controller 12. Angular position detector 21 connected to the crankshaft 6 detects the angular position of the crankshaft 6 and gives an angular position signal representing the angular position of the crankshaft 6 to the picking crank angle controller 12, and then the picking crank angle controller 12 opens the shutoff valves 17 and 18 at a picking angle and keeps the shutoff valves 17 and 18 for a predetermined period to jet compressed picking fluid supplied from the compressed fluid source 13 through the main picking nozzle 19 and the auxiliary picking nozzles 20 to insert a weft yarn 22 in a shed 24 formed by the warp yarns 23.

The angular position detector 21 is connected also to the rotation controller 3, the operation monitor 8 and the sequence controller 7. A pick counter 54 detects the rotating speed of the main motor 5 and outputs a rotating speed signal representing the rotating speed of the main motor 5 through the communication controller 2 to the host computer 30, which uses the rotating speed signal as data for calculating production m. A flowmeter 55 provided after the compressed fluid source 13 measures the flow rate of the picking fluid to provide data for calculating the quantity a of the picking fluid consumed.

The condition of the pick or picked weft yarn 22 picked in each picking cycle is detected by a weft detector 29 disposed near the selvedge of the fabric on the side opposite the picking side. The detection signal provided by the detector 29 is input to the fluid pressure controller 11. The fluid pressure controller 11 compares actual arriving time when the picked weft yarn 22 arrived at a predetermined arriving position and desired arriving time, controls the pressure regulators 15 and 16 in a PID control mode according to the deviation between the actual arriving time and the desired arriving time to regulate the pressure of the picking fluid.

The weft yarn 22 of a length sufficient for one picking cycle supplied from a yarn package 25 is measured and stored by, for example, a drum type weft yarn measuring and storing device 26. The weft yarn 22 stored on the storage drum of the weft yarn measuring and storing device 26 is retained on the storage drum with a retaining pin 27, which is driven by a solenoid actuator 28 controlled by the picking crank angle controller 12 to release the weft yarn 22.

Method of Optimizing Control of the Looms for Maximum Economic Efficiency

The host computer 30 carries out centralized control of the looms according to a control program to improve the economic efficiency of the weaving mill.

Figure 4:
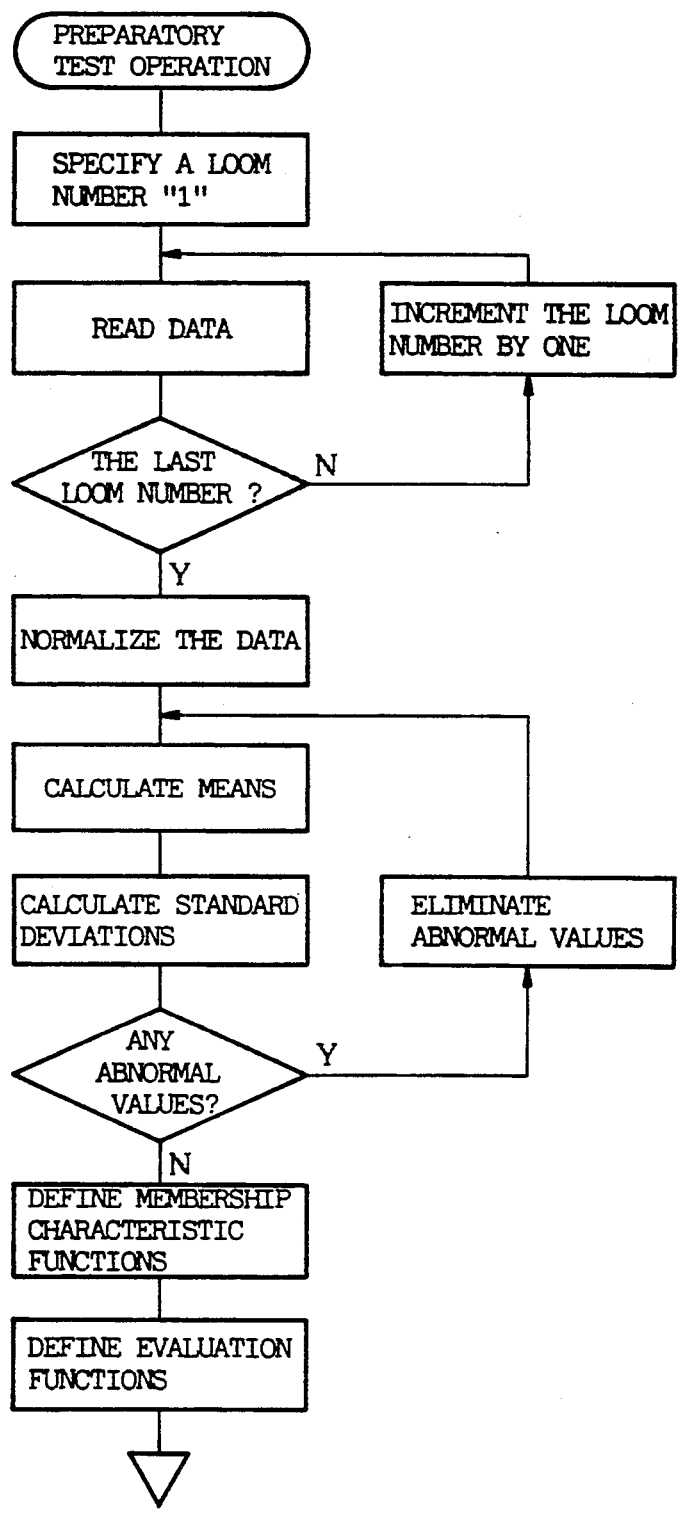
FIG. 4 is a flowchart of a procedure of preparatory test operation for the improvement of the economic efficiency of a weaving mill.

A preparatory test operation is carried out by a procedure as shown in FIG. 4. First, a loom number "1" is selected to specify the controlled loom 33, and data representing parameters dominating the economic efficiency of the weaving mill is collected in a predetermined preparatory test period. The loom numbers of all the looms 33 are selected sequentially to execute the data acquisition operation for all the looms 33. After the data representing the operating condition of all the looms 33 has been acquired, the data is normalized by time. The preparatory test period is used as the time for normalization. The normalized data is processed to obtain the following means and standard deviations as reference data.

Operating time: Mean: R, Standard deviation: $\sigma_r$
Warp stop time: Mean: $t_1$, Standard deviation: $\sigma_{t1}$
Warp stop frequency: Mean: $S_1$, Standard deviation: $\sigma_{s1}$
Weft stop time: Mean: $t_2$, Standard deviation: $\sigma_{t2}$
Weft stop frequency: Mean: $S_2$, Standard deviation: $\sigma_{s2}$
Inoperative time: Mean: $t_0$, Standard deviation: $\sigma_{t0}$
Rotating speed: Mean: N, Standard deviation: $\sigma_n$
Production: Mean: M, Standard deviation: $\sigma_m$
Power consumption: Means: W, Standard deviation: $\sigma_w$
Air consumption: Mean: A, Standard deviation: $\sigma_a$ The mean operating time R of the normalized operating time is mean operating time for unit time and hence the mean operating time R corresponds to operation rate. The mean stop time $t_i$ is dependent on the ability of the operator. Therefore, the means stop time $t_i$ is determined for a group of looms to which each operator is assigned. The data of the rest of the parameters are determined for a group of looms weaving fabrics of the same quality.

If the means and standard deviations of the parameters include abnormal values, such as the mean and standard deviation of measured data obtained in an excessively short measuring period, for example, a measuring period shorter than half the test period, or those outside the three-sigma limits, the abnormal values are eliminated.

Figure 6:
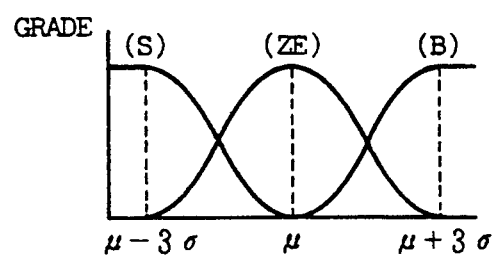
FIG. 6 is a diagram of assistance in explaining a procedure of setting a membership characteristic function.
Figure 7:
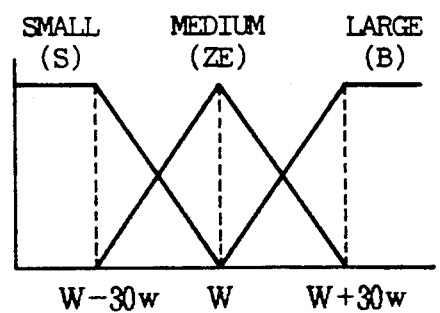
FIG. 7 is a diagram of assistance in explaining a procedure of setting a membership characteristic function of the quantity of power consumed.

Then, a membership characteristic function is defined. As shown in FIG. 6, the membership characteristic function is defined with reference to the mean and a value equal to three times the standard deviation, i.e., three sigmas, of each parameter. For example, as shown in FIG. 7, power consumption, which is used as the if-clause of a fuzzy control law, is represented by three triangular fuzzy labels (S), (ZE) and (B) by using the mean W and standard deviation sw of power consumption. The accuracy of inference for fuzzy control, namely, the accuracy of estimation of set points that will not reduce the economic efficiency of the weaving mill below the economic efficiency determined by the data obtained through preparatory test operation, can be improved by defining the membership characteristic function on the basis of the data obtained by the preparatory test operation. The evaluation function E3 is defined on the basis of the expression (3).

$$E3 = n(1 - Ss_i \cdot t_i - t_0)(QS - Y) - (w + Ka)E$$

where $t_i$ and $t_0$ are the means of stop time and the mean of downtime, respectively, obtained by processing the data obtained through the preparatory test operation.

The means $t_i$ of stop time and the mean $t_0$ of downtime are dependent on the ability of the operator and hence those values are used as constants in the control operation, and only the rotating speed n, the stop frequency $s_i$, power consumption 2 and picking fluid consumption a are used as variables. The expected economic efficiency of the weaving mill is estimated on the basis of these variables.

The following constants representing the operating condition of the weaving mill are determined beforehand as basic data.

Q: Fractions nondefective for fabrics of different qualities
S: Unit fabric price for fabrics of different qualities
Y: Yarn costs for fabrics of different qualities
K: Conversion factor
E: Energy charge The means of data obtained through the preparatory test operation are substituted into a definition equation defining an valuation function B3 to estimate the expected economic efficiency of the weaving mill.

$$B3 = N(1 - SS_it_i - t_0)(QS - Y) - (W + KA)E$$

Thus, the membership characteristic function and the evaluation function, which are used for the control of the preparatory test operation. The contents of definition of the membership characteristic function are entered through the membership characteristic function setting unit 42 in the fuzzy controller 41.

Figure 5:
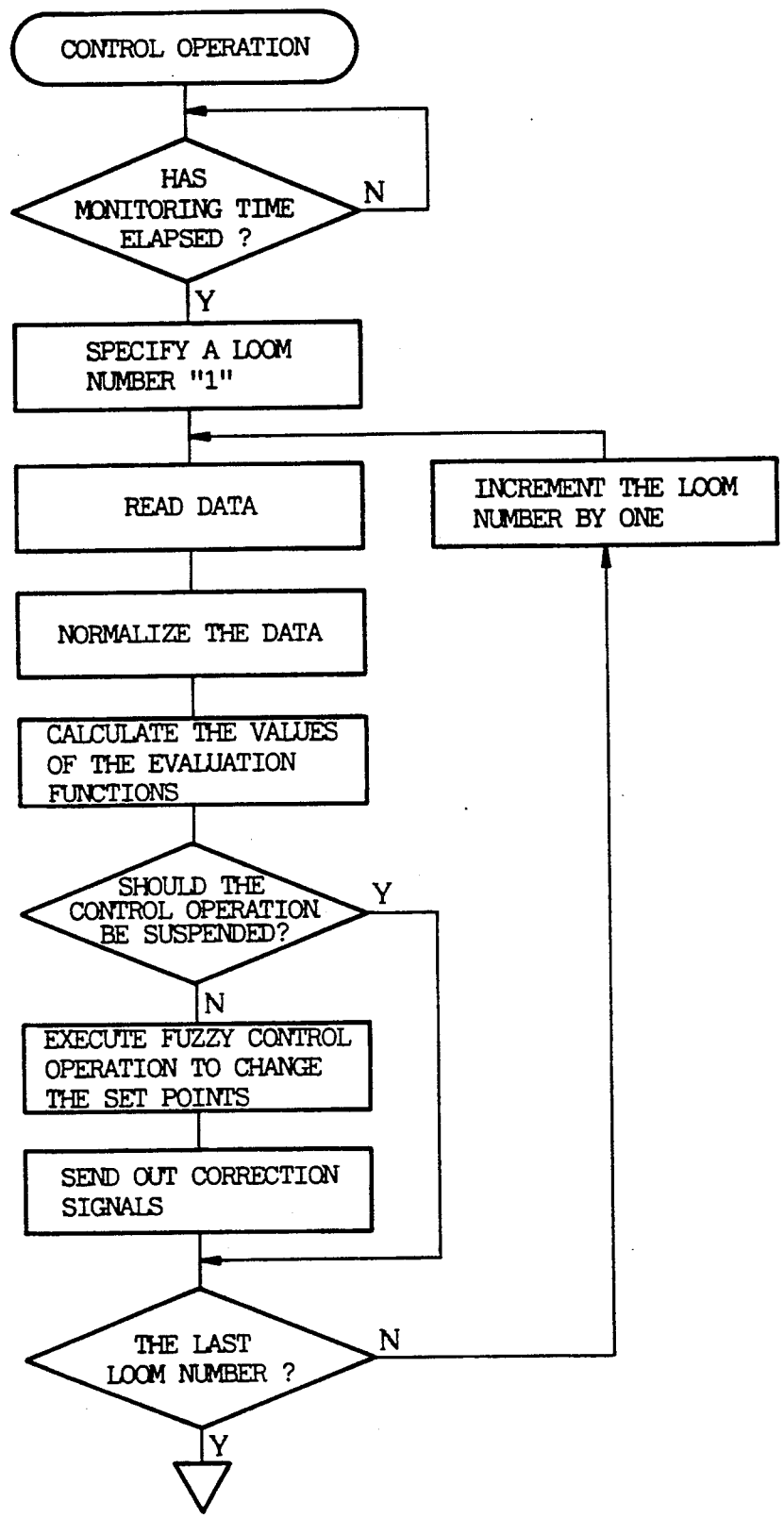
FIG. 5 is a flow chart of a control procedure for the improvement of the economic efficiency of a weaving mill.

During the production operation of the looms 33, a control procedure shown in FIG. 5 is executed. After monitoring time has elapsed from the start of the control procedure, a loom number "1" is specified to read the values of the parameters representing the operating condition of the loom No. 1 among the looms 33. The parameters are monitoring time T, stop frequencies $k_i$ (warp stop frequency $k_1$ and weft stop frequency $k_2$), stop time $ST_{ij}$ (warp stop time $ST_{1j}$ and weft stop time $S_{2j}$, where j=1,2, ... and n, and $T_{ij}$ is the duration of each stop for each cause of stop), downtime $T_0$, production $M_0$, rotating speed $N_0$, power consumption $W_0$ and picking fluid consumption $A_0$.

Since a practical weaving mill works on three shifts and errors in the data increase if the monitoring time is excessively short, the monitoring time must be sufficiently long and shorter than the working time of each shift. Preferable monitoring time is on the order of one hour, which may be changed.

The data acquired during the monitoring period are normalized by the monitoring time T using the following formulas.

| | |
|---|---|
| Stop frequency: | $s_i = k_i/T$ |
| Stop time: | $t_i = ST_{ij}/k_i$ |
| Inoperative time: | $t_0/T$ |
| Production: | $m = M_0/T$ |
| Power consumption: | $w = W_0/T$ |
| Air consumption: | $a = A_0/T$ |

Then, the value of the evaluation function E3 is calculated by substituting the data into the evaluation function E3.

$$E3 = N_0(1 - Ss_it_i - t_0)(QS - Y) - (w + Ka)E$$

Then, a query is made to see if the control of the loom No. 1 is to be held in suspense; that is, the data is judged unreliable and the control of the loom No. 1 is held in suspense if the operating time is smaller than half the monitoring time, and the operating condition of the loom No. 1 is judged appropriate, the expected economic efficiency of the weaving mill is judged higher than that estimated through the preparatory test operation and the control of the loom No. 1 is held in suspense if the value of the evaluation function E3 is not lower than that of the evaluation function B3. If the loom No. 1 needs to be controlled, the following fuzzy control operation is executed to change the set points for the loom No. 1

Fuzzy Control Laws

Fuzzy control laws to be executed by the fuzzy controller 41 are prescribed by the control law setting unit 43.

(1) If the value of the evaluation function E3 is smaller than the value of the expected economic efficiency, i.e., the value of the evaluation function B3, and the power consumption 2 is far greater than the power consumption W, reduce the rotating speed. (Reduction of power consumption)

(2) If the value of the evaluation function E3 is smaller than the value of the expected economic efficiency, i.e., the value of the evaluation function B3, and the picking fluid consumption a is far greater than the picking fluid consumption A, reduce the rotating speed. (Reduction of picking fluid consumption)

The fuzzy controller 41 truncates the membership characteristic functions of the then-clauses of the control laws (1) and (2) according to the goodness of fit of the data to the if-clauses of the control laws (1) and (3), determines the synthetic membership function of the truncated membership functions, determines the center of gravity of the synthetic membership function, determines a rotating speed correction DN to the set point controller 1 of the loom 33. A known method of fuzzy inference may be employed.

The same procedure is repeated for next loom 33 to control all the looms 33 sequentially. After new set points are determined for all the looms 33, the control procedure is terminated.

The fuzzy controller 41 specifies the numbers of the looms 33 sequentially to obtain necessary data of the looms 33 to determine the rotating speed corrections for the looms 33 sequentially according to the fuzzy control laws for the improvement of the economic efficiency of the weaving mill, and sends the rotating speed corrections to the set point controllers 1 of the looms 33. Then, the set point controller 1 gives data corresponding to the rotating speed correction DN to the relevant units to change the rotating speed and the operating mode of the related units of the loom 33.

Thus, the method of optimizing control of the looms corrects the rotating speed, i.e., a parameter affecting the economic efficiency, of the loom meeting an inequality: (the value of the evaluation function E3) < (the value of the evaluation function B3). As is obvious from the expressions (1), (2) and (3), the inequality is satisfied even if the production m or the operating time (operating rate) r is small. Therefore, it is preferable that the method uses additional evaluation functions which prevents the reduction of the production and the operating rate. A method of optimizing control of looms for maximum economic efficiency in a second embodiment according to the present invention incorporating a method of improving the production and the operating rate will be described hereinafter. The method in the second embodiment is basically the same as the method in the first embodiment.

The following two evaluation functions are defined on the basis of the expressions (1) and (2) by using the mean stop time $t_1$ and the mean downtime $t_0$ determined through preparatory test operation.

$$E1 = 1 - Ss_f \cdot t_1 - t_0$$

$$E2 = n(1 - Ss_f \cdot t_i - t_0)$$

The values of the evaluation functions E1 and E2 are an expected operating rate and an expected production, respectively. The means of data obtained through the preparatory test operation are substituted into the evaluation functions E1 and E2, i.e., an expected operating rate B1 and an expected production B2.

$$B1 = 1 - SS_f \cdot t_i - t_0$$

$$B2 = N(1 - SS_f \cdot t_i - t_0)$$

Then, data is collected by the control procedure shown in FIG. 5 and the collected data is normalized by the monitoring time T. The normalized data is substituted into the evaluation functions E1 and E2 to calculate the values of the evaluation functions E1 and E2 for the operating looms, i.e., an expected production and an expected operating rate.

$$E1 = 1 - Ss_f \cdot t_i - t_0$$

$$E2 = N_0(1 - Ss_f \cdot t_i - t_0)$$

Then, a query is made to see if the control of the loom is to be held in suspense. The control of the loom is held in suspense if the operating time of the loom is shorter than half the monitoring time or if the value of the evaluation function E1 is not smaller than the value of the evaluation function B1 or the value of the evaluation function E2 is not smaller than the value of the evaluation function B2, an, if not, the set points for the loom is changed according to the following fuzzy control laws.

Generally, the loom is provided with various automatic control systems, such as an automatic picking crank angle control system for automatically timing the picking operation of the main picking nozzle, an automatic pressure control system for automatically controlling the pressure of the picking fluid to be jetted through the main picking nozzle and the auxiliary picking nozzles, an automatic auxiliary picking nozzle control system for automatically controlling the picking fluid jetting operation of the auxiliary picking nozzles in synchronism with the picking fluid jetting operation of the main picking nozzle and an automatic warp tension control system for automatically adjusting the tension of the warp yarns to a desired warp tension for follow-up control of the warp tension. The automatic control systems relating to the automatic control of the picking operation change the pressure of the picking fluid or the picking crank angle automatically so that the picked weft yarn arrives at a position corresponding to the weft yarn sensor at a predetermined crank angle.

When the loom is provided with such automatic control systems, signals to be sent, for example, to the automatic picking crank angle control system to change the picking crank angle may represent the upper and lower limits of picking crank angle. If a signal representing a picking crank angle is given to the automatic picking crank angle control system to correct the picking crank angle, the automatic picking crank angle control system will change the picking crank angle again from the corrected picking crank angle to the picking crank angle just before correction and the picking crank angle cannot be corrected. When the difference between the upper and lower limits is large, the parameter must be changed gradually to obviate sharp change in the condition of the automatic control system.

If the loom is provided with an automatic control system for controlling the pressure of the picking fluid to be jetted through the main picking nozzle, it is possible to change the pressure of the picking fluid automatically by changing the upper and lower limit of picking crank angle; that is, the pressure of the picking fluid can be controlled by correcting the upper and lower limits of picking crank angle. When the pressure of the picking fluid is controlled in such a mode, (the lower limit of picking crank angle is lowered) fi (picking crank angle is delayed) fi (arrival of the picked weft yarn at the arriving position is delayed) fi (the pressure of the picking fluid increases) or (the lower limit of picking crank angle is raised) fi (picking crank angle is advanced) fi (arrival of the picked weft yarn at the arriving position is advanced) fi (the pressure of the picking fluid decreases). Consequently, the pressure of the picking fluid varies according to the upper limit of picking crank angle. If the loom is not provided with such an automatic control system for automatically controlling the pressure of the picking fluid, signals representing a picking crank angle and a pressure are given to the loom controller.

The following fuzzy control laws are defined on an assumption that the fluid pressure controller 11 of the controlled loom does not have the function to control the pressure of the picking fluid automatically, and the picking crank angle controller 12 of the same does not has a function to control picking crank angle automatically and controls the shutoff valves 17 and 18 according to the set points. The set picking crank angle for the picking crank angle controller 12 is changed to change the pressure of the picking fluid. The fuzzy controller 41 controls the loom according to the following fuzzy control laws set by the control law setting unit 43.

(3) If weft stop frequency in a predetermined period is relatively large and picking crank angle is excessively delayed, advance picking crank angle. (The pressure of the picking fluid is excessively high.)

(4) If weft stop frequency in a predetermined period is relatively large and picking crank angle is excessively advanced, delay the picking crank angle. (The pressure of the picking fluid is excessively low and the entanglement of the picked weft yarn with the warp yarns must be prevented.)

(5) If weft stop frequency in a predetermined period is relatively large and warp stop frequency in a predetermined period is relatively large, hold the present picking crank angle. (Warp stop is a problem more serious than weft stop.)

(6) If picking crank angle is excessively delayed, do not delay picking crank angel any further.

(7) If picking crank angel is excessively advanced, do not advance picking crank angle any further.

(8) If weft stop frequency in a predetermined period is relatively large and the warp tension is relatively low, increase warp tension. (The entanglement of the picked weft yarn with the warp yarns must be prevented.)

(9) If warp stop frequency in a predetermined period is relatively large and warp tension is relatively high, reduce warp tension. (Warp yarn breakage must be prevented.)

(10) If warp tension is very high, do not increase warp tension any further.

(11) If warp tension is very low, do not decrease warp tension any further.

If the fluid pressure controller 11 does not have any automatic fluid pressure control function, the set pressure must be changed. For such an occasion, the following fuzzy control lows are defined.

(12) If weft stop frequency in a predetermined period is relatively large and picking crank angle is delayed, reduce the pressure of the picking fluid and advance picking crank angle. (Excessively high pressure is undesirable.)

(13) If weft stop frequency in a predetermined period is relatively large and picking crank angle is advanced, increase the pressure of the picking fluid and delay picking crank angle. (Picked weft yarn is liable to be caught by the warp yarns if the pressure of the picking fluid is relatively low.)

(14) If weft stop frequency in a predetermined period is relatively large and warp stop frequency is relatively large, do not change the pressure of the picking fluid. (Warp stop is a problem more serious than weft stop.)

(15) If the pressure of the picking fluid is very high, do not increase the pressure of the picking fluid any further.)

(16) If the pressure of the picking fluid is very low, do not reduce the pressure of the picking fluid any further.

The fuzzy control lows (6), (7), (10), (11), (15) and (16) restrict control ranges. Accordingly, to execute control operation according to those fuzzy control laws, upper and lower limits of picking crank angle, the pressure of the picking fluid and warp tension must be determined beforehand. set points may be limited within predetermined ranges by entering set points through upper and lower limiters in changing the set points.

The following fuzzy control laws are prescribed for the improvement of production.

(17) If weft stop frequency in a predetermined period is relatively large and picking crank angle is advanced greatly, reduce the rotating speed of the crankshaft. (Time available for the perfect insertion of a picked weft yarn is insufficient.)

(18) If warp stop frequency in a predetermined period is relatively large and warp tension is excessively low, reduce the rotating speed of the crankshaft. (The strength of warp yarns is not high enough to enable high-speed weaving.)

The present weaving conditions are judged appropriate when the value of the evaluation function E2 is greater than that of the evaluation function B2, and control operation is held in suspense. However, the control program may include the following additional fuzzy control laws for the positive increase of rotating speed.

(19) If the value of the evaluation function E2 is greater than that of the evaluation function B2, increase the rotating speed of the crankshaft. (The rotating speed of the crankshaft of the looms operating at a high operating rate is increased.)

The following fuzzy control law may be added as preventive means for preventing troubles liable to result from increase in rotating speed.

(20) If the rotating speed of the crankshaft is relatively high and picking crank angle is relatively delayed, advance picking crank angle. (Sufficiently long time is secured for the complete insertion of a weft yarn having a relatively low strength and the pressure of the picking fluid is reduced.)

(21) If the rotating speed of the crankshaft is relatively high and warp tension is relatively high, decrease warp tension. (Warp tension is decreased when the strength of the warp yarns is not sufficiently high.)

The following fuzzy control laws may be added as restrictive conditions.

(22) If the rotating speed of the crankshaft is very high, do not increase the rotating speed any further.

(23) If the rotating speed of the crankshaft is very low, do not decrease the rotating speed any further.

These fuzzy control laws are bound by predetermined upper and lower limits of rotating speed.

The fuzzy controller 41 executes fuzzy inference according to the foregoing fuzzy control laws to calculate corrections for the set points, namely, a crank angle correction Dq, a pressure correction DP, a warp tension correction DT and a rotating speed correction DN, and outputs the corrections to the loom controller 7 of the relevant loom 33.

The foregoing fuzzy control laws are examples only and, if necessary, may be modified optionally. Additional fuzzy control laws dealing with other input and output parameters may be used. For example, the following fuzzy control laws deals with the variation of crank angle corresponding to the moment when the picked weft yarn arrives at the arriving position corresponding to the pick detector 29 as a parameter affecting operating rate, and the rotating speed of the crankshaft of the loom as a set point for the loom.

(1) If crank angle corresponding to the moment when the picked weft yarn arrives at the arriving position varies in a wide range, increase the pressure of the picking fluid.

(2) If crank angle corresponding to the moment when the picked weft yarn arrives at the arriving position varies in a narrow range, decrease the pressure of the picking fluid.

(3) If crank angle corresponding to the moment when the picked weft yarn arrives at the arriving position varies in a wide range, decrease the rotating speed of the crankshaft of the loom.

(4) If crank angle corresponding to the moment when the picked weft yarn arrives at the arriving position varies in a narrow range, increase the rotating speed of the crankshaft of the loom.

When a pick detector H2 is disposed at a position to which the leading end of a normally picked weft yarn is unable to reach after the pick detector 29 (H1) disposed at the position corresponding to the arriving position of the picked weft yarn, in addition to the pick detector H1, follofollowing fuzzy control laws ,nay additionally be used.

(1) If the number of picked weft yarns unable to reach the arriving position corresponding to the pick detector H1 in a predetermined period is large, increase the pressure of the picking fluid.

(2) If the number of picked weft yarns unable to reach the arriving position corresponding to the pick detector H1 in a predetermined period is large, delay picking operation.

(3) If the number of picked weft yarns detected in a predetermined time by the pick detector H2 is large, decrease the pressure of the picking fluid.

(4) If the number of picked weft yarns detected in a predetermined time by the pick detector H2 is large, decrease the rotating speed of the crankshaft of the loom.

Furthermore, the control program may additionally include fuzzy control laws for changing set points for looms incapable of automatic set point changing control. For example, the control program may include the following fuzzy control laws for changing the height of the shed.

(1) If the rotating speed of the crankshaft of the loom is relatively high and weft stop frequency in a predetermined period is relatively large, increase the height of the shed.

(2) If the rotating speed of the crankshaft of the loom is relatively high and the warp stop frequency is relatively large, decrease the height of the shed.

When the loom is incapable of automatic set point changing control, an alarm is generated by the loom when the height of the shed needs to be changed to request the operator to change the height of the shed.

In the foregoing embodiment, the downtime and the stop time, which are dependent on the ability and efficiency of the operator and unable to be controlled mechanically, are represented by the statistical means of the data thereof obtained through the preparatory test operation and the operating condition of the loom is evaluated with reference to expected values calculated by using evaluation functions on an assumption that the statistical means are constant. Such a control mode eliminates causes of errors in the control data for controlling the looms and hence the reliability of the control operation is enhanced. However, it is possible that the control system execute wrong control operation due to the change of the stop time and the downtime determined through the preparatory test operation, for example, when the operator is changed for another. To obviate wrong control operation, it is possible to monitor the stop time and the downtime during operation after the preparatory test operation and to generate and alarm when the stop time or the downtime deviates from a predetermined range of variation. The predetermined range of variation is, for example, (Mean)±3s. When an alarm is generated, the control operation for changing the set points is interrupted and, if necessary, the preparatory test operation is executed.

Although the foregoing embodiments use the evaluation function to evaluate the operating condition of the loom, the evaluation functions need not necessarily be used. New set points may be calculated through the fuzzy inference of the operating condition of all the looms without using any evaluation function, instead of comparing the values of the evaluation functions calculated by using data obtained through the preparatory test operation and those of the evaluation functions calculated by using data acquired during the actual operation of the looms, and changing the set points only for the looms through fuzzy inference. Such a control mode is executed, for example, according to the following fuzzy control laws.

(1) If the power consumption w is far greater than the power consumption W, decrease the rotating speed of the crankshaft.

(2) If the air consumption a is far greater than the air consumption A, decrease the rotating speed of the crankshaft.

Since the wait time, in general, is far longer than the repair time, the mean stop time may be the mean of the sum of the weft stop time and the warp stop time.

Although time of stop due to the breakage of the leno catch cord is included in the downtime in the foregoing embodiments, the frequency of leno catch cord breakage and time spent for repairing the broken leno catch cord may be measured individually.

The optimizing control method of the present invention may be applied to the individual control of looms as well as to the centralized control of a group of looms.

The correction of the set points may be achieved, for example, by an expert system using or without using the evaluation functions instead of by the fuzzy control laws.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. A method of optimizing control of looms for improving the economic efficiency of a weaving mill, said method comprising steps of:
   creating reference data by collecting the data of parameters dominating the economic efficiency of a weaving mill through the preparatory test operation of the controlled looms in a predetermined test period and normalizing the collected data of the parameters by the time of the test period;
   collecting the data of the parameters in a monitoring period during the practical weaving operation of the looms;
   creating operation data by normalizing the data of the parameters collected in the monitoring period by the time of the monitoring period; and
   comparing the operation data with the reference data to determine new set points on the basis of the comparison so as to optimize the economic efficiency of the weaving mill.

2. A method of optimizing control of looms for the improvement of the economic efficiency of a weaving mill according to claim 1, wherein the parameters dominating the economic efficiency of the weaving mill are stop frequency, stop time, downtime, the rotating speed of the crankshaft, power consumption and picking fluid consumption.

3. A method of optimizing control of looms for the improvement of the economic efficiency of a weaving mill according to claim 1, wherein the set point for control operation is the rotating speed of the crankshaft of the loom.

4. A method of optimizing control of looms for improving the economic efficiency of a weaving mill, said method comprising steps of;
   creating economic efficiency evaluation functions by collecting the data of parameters dominating the economic efficiency of a weaving mill through the preparatory test operation of the controlled looms in a predetermined test period and by using the data of the parameters unaffected by set points as constants, and the parameters affected by the set points as variables;

collecting the data of the parameters affected by the set points in a monitoring period during practical operation of the looms;

determining further evaluation functions by substituting the data of the parameters affected by the set points, collected in the preceding step into the evaluation functions determined through the preparatory test operation; and determining new set points on the basis of the result of comparison between the evaluation functions determined through the preparatory test operation and the evaluation functions determined in the preceding step.

5. A method of optimizing control of looms for the improvement of the economic efficiency of a weaving mill according to claim 4, wherein the parameters affected by the set points are stop frequency, the rotating speed of the crankshaft, power consumption and picking fluid consumption, and the parameters not affected by the set points are stop time and downtime.

6. A method of optimizing control of looms for the improvement of the economic efficiency of a weaving mill according to claim 4, wherein the parameters dominating the economic efficiency of the weaving mill are stop frequency, stop time, downtime, the rotating speed of the crankshaft, power consumption and picking fluid consumption.

7. A method of optimizing control of looms for the improvement of the economic efficiency of a weaving mill according to claim 4 wherein the set point for control operation is the rotating speed of the crankshaft of the loom.

* * * * *